(12) United States Patent
Gopalakrishnan et al.

(10) Patent No.: US 9,769,689 B2
(45) Date of Patent: Sep. 19, 2017

(54) METHOD AND APPARATUS FOR OPTIMIZING CELL SPECIFIC ANTENNA CONFIGURATION PARAMETERS

(71) Applicant: Futurewei Technologies, Inc., Plano, TX (US)

(72) Inventors: Nandu Gopalakrishnan, Chatham, NJ (US); Jin Yang, Bridgewater, NJ (US); Yongxi Tan, Hillsborough, NJ (US); James Matthew, Bellemead, NJ (US); Yan Xin, Princeton, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 121 days.

(21) Appl. No.: 14/963,062

(22) Filed: Dec. 8, 2015

(65) Prior Publication Data
US 2016/0165468 A1 Jun. 9, 2016

Related U.S. Application Data

(60) Provisional application No. 62/089,654, filed on Dec. 9, 2014, provisional application No. 62/096,439, filed
(Continued)

(51) Int. Cl.
*H04L 1/00* (2006.01)
*H04W 24/08* (2009.01)
(Continued)

(52) U.S. Cl.
CPC ........... *H04W 24/08* (2013.01); *H04W 16/28* (2013.01); *H04W 24/02* (2013.01)

(58) Field of Classification Search
None
See application file for complete search history.

(56) References Cited

U.S. PATENT DOCUMENTS 9,136,932 B2 * 9/2015 Asplund ............. H04B 7/0632
2004/0201526 A1 10/2004 Knowles et al.
(Continued)

FOREIGN PATENT DOCUMENTS

CN 101557654 A 10/2009
CN 102202330 A 9/2011
(Continued)

OTHER PUBLICATIONS

Office Action dated Jul. 20, 2016 in U.S. Appl. No. 14/971,870, 14 pages.
(Continued)

*Primary Examiner* — Minh-Trang Nguyen
(74) *Attorney, Agent, or Firm* — Vierra Magen Marcus LLP

(57) ABSTRACT

Adjusting cell specific antenna configuration parameters includes receiving, at each of a plurality of radio access nodes in a network, measurement reports from a plurality of user equipment devices. Base incremental adjustments to configuration parameters of one or more antennas are performed at each radio access node in response to the measurement reports. Additional measurement reports are received from the plurality of user equipment devices after the incremental adjustments. Base incremental adjustments to the configuration parameters of the one or more antennas at the radio access nodes continue to be performed in response to the measurement reports after previous incremental adjustments until an improvement limit has occurred. Biased random adjustments to the configuration parameters of the one or more antennas at the radio access nodes are performed in response to the improvement limit until a desired optimum result is achieved.

22 Claims, 14 Drawing Sheets

Related U.S. Application Data on Dec. 23, 2014, provisional application No. 62/093,283, filed on Dec. 17, 2014, provisional application No. 62/099,854, filed on Jan. 5, 2015, provisional application No. 62/100,003, filed on Jan. 5, 2015.

(51) Int. Cl.
*H04W 16/28* (2009.01)
*H04W 24/02* (2009.01)

(56) References Cited

U.S. PATENT DOCUMENTS

| | | | |
|---|---|---|---|
| 2009/0279519 A1 | 11/2009 | Brisebois et al. | |
| 2010/0182916 A1* | 7/2010 | Drewes | H04B 7/15521 370/252 |
| 2010/0238984 A1* | 9/2010 | Sayana | H04B 7/0634 375/219 |
| 2011/0287762 A1 | 11/2011 | Kumar et al. | |
| 2012/0106370 A1 | 5/2012 | Radulescu et al. | |
| 2012/0220291 A1 | 8/2012 | Olsson et al. | |
| 2014/0036656 A1 | 2/2014 | Chou et al. | |
| 2014/0329528 A1 | 11/2014 | Zhao et al. | |
| 2015/0052255 A1 | 2/2015 | Sun et al. | |
| 2015/0056981 A1 | 2/2015 | Song et al. | |
| 2015/0141027 A1 | 5/2015 | Tsui et al. | |
| 2015/0223084 A1 | 8/2015 | Lightstone et al. | |
| 2015/0373563 A1 | 12/2015 | Chou | |
| 2016/0029253 A1 | 1/2016 | Sarkar et al. | |
| 2016/0080061 A1 | 3/2016 | Yang et al. | |

FOREIGN PATENT DOCUMENTS

| | | |
|---|---|---|
| CN | 102300221 A | 12/2011 |
| CN | 103152755 A | 6/2013 |
| CN | 103906073 A | 7/2014 |
| KR | 20110014806 A | 2/2011 |
| WO | 2014190472 A1 | 12/2014 |

OTHER PUBLICATIONS

Response to Office Action dated Oct. 14, 2016 in U.S. Appl. No. 14/971,870, 14 pages.

Notice of Allowance dated Dec. 2, 2016 in U.S. Appl. No. 14/971,870, 7 pages.

International Search Report and Written Opinion dated Mar. 4, 2016 in International Patent Application No. PCT/CN2015/097666, 12 pages.

International Search Report and Written Opinion dated Mar. 8, 2016 in International Patent Application No. PCT/CN2015/096816, 11 pages.

* cited by examiner

After Iteration 1

After Iteration 4

After Iteration 7

After Iteration 9

After Iteration 10

After Iteration 1

After Iteration 4

After Iteration 7

After Iteration 9

After Iteration 10

METHOD AND APPARATUS FOR OPTIMIZING CELL SPECIFIC ANTENNA CONFIGURATION PARAMETERS

RELATED APPLICATIONS

The present application claims the benefit of the following U.S. Provisional applications:
U.S. Provisional Application No. 62/089,654 filed Dec. 9, 2014;
U.S. Provisional Application No. 62/096,439 filed Dec. 23, 2014;
U.S. Provisional Application No. 62/093,283 filed Dec. 17, 2014;
U.S. Provisional Application No. 62/099,854 filed Jan. 5, 2015; and
U.S. Provisional Application No. 62/100,003 filed Jan. 5, 2015,
All of these are hereby incorporated herein by reference.

TECHNICAL FIELD

The present disclosure relates in general to self-organizing networks and coverage capacity optimization and more particularly to a method and apparatus for optimizing cell specific antenna configuration parameters.

BACKGROUND

A self-organizing network (SON) is an automation technology designed to make the planning, configuration, management, optimization, and healing of mobile radio access networks simpler and faster. SON functionality and behavior has been defined and specified in generally accepted mobile industry recommendations produced by organizations such as 3rd Generation Partnership Project (3GPP) and Next Generation Mobile Networks (NGMN). SON is considered critical to operators' strategy for meeting the exploding demand for data in the coming decade—the era of the Internet of Things. SON is considered necessary to automate operations and optimize performance in a scalable manner for small cell driven heterogeneous networks (HetNets). As SON evolves it will be run on Big Data platforms in the cloud powered by "intelligent" predictive analytics algorithms.

Coverage Capacity Optimization (CCO) is a SON use case that initially configures and adjusts key RF parameters (antenna tilt and azimuth configuration and power) post-deployment to maximize some measure of user quality of experience (QoE) (in particular, coverage, quality and capacity) and adapt to changing traffic patterns and changes in environment. CCO is expected to work on a long timescale in the order of hours/days to capture and react to long term or seasonal changes in traffic and environment and also allows for sufficient data collection for accurate observation and estimation of CCO performance.

A current CCO solution is known as Automatic Cell Planner (ACP). ACP uses measure report (MR) and drive test (DT) data with user equipment (UE) geo-location data obtained through Assisted Global Positioning System (AGPS) and accurate antenna configuration parameters for accurate propagation modeling. However, ACP being a modeling approach requires costly drive testing and human verification. For ACP, knowledge of UE locations is essential and obtaining accurate antenna configuration parameters is subject to human error. Moreover, ACP is not scalable to small cells and HetNets as too much manual effort is required for setup and verification.

SUMMARY

From the foregoing, it may be appreciated by those skilled in the art that a need has arisen for a CCO technique that does not require UE location, accurate antenna configuration parameters, or offline modeling. In accordance with the present disclosure, a method and apparatus for optimizing cell specific antenna configuration parameters are provided that greatly reduce or substantially eliminate problems and disadvantages associated with current SON CCO solutions.

According to an embodiment, there is provided a method for adjusting cell specific antenna configuration parameters that includes receiving, at each of a plurality of radio access nodes in a network, measurement reports from a plurality of user equipment devices. Base incremental adjustments to configuration parameters of one or more antennas are performed at each radio access node in response to the measurement reports. Additional measurement reports are received from the plurality of user equipment devices after the incremental adjustments. Base incremental adjustments to the configuration parameters of the one or more antennas at the radio access nodes continue to be performed in response to the measurement reports after previous incremental adjustments until an improvement limit has occurred. Biased random adjustments to the configuration parameters of the one or more antennas at the radio access nodes are performed in response to the improvement limit until a desired optimum result is achieved.

The present disclosure describes many technical advantages over conventional system behavior and performance analysis techniques. For example, one technical advantage is to provide a closed loop optimization process based on UE MR data from a real network and not through a modeled network. Another technical advantage is to provide optimization without the need for UE location or antenna configuration information. Other technical advantages may be readily apparent to and discernable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the disclosure may be implemented in any type of suitably arranged device or system. Features shown and discussed in one figure may be implemented as appropriate in one or more other figures.

Figure 1:
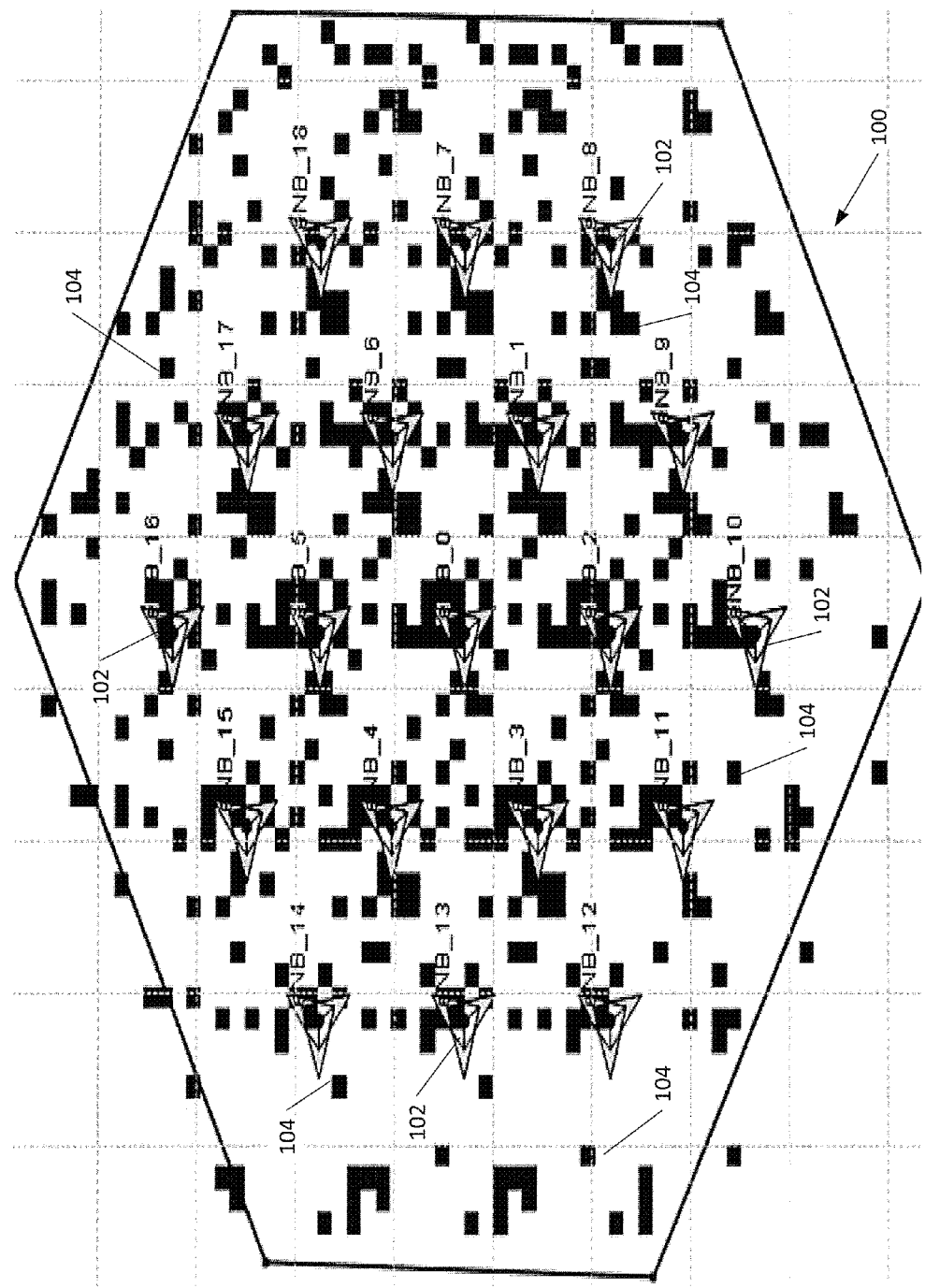
FIG. 1 illustrates an example of a Long Term Evolution (LTE) network.

FIG. 1 shows an example of a Long Term Evolution (LTE) network 100. LTE network 100 is a type of wireless communications network designed to provide broadband Internet and phone service to user equipment (UE) such as mobile phones and other types of devices. Voice calls on an LTE network are converted into small chunks of data, which eliminates the need for separate voice circuits. These types of networks are often marketed as "4G" and are capable of offering speeds that rival wired broadband services. They also offer increased capacity, which may help wireless carriers deal with the increasing amounts of data used by smart phones and other devices. Though discussed in terms of LTE network 100, the present disclosure may also be applicable to other known or future wireless communications networks.

In the example of FIG. 1, LTE network 100 is partitioned into multiple cells provided by 19 Evolved Node B (eNB) radio access nodes 102. The eNB radio access nodes 102 provide service for multiple UE devices 104. The number of eNB radio access nodes 102 and UE devices 104 operating within LTE network 100 may be greater or fewer than what is depicted in FIG. 1. Each eNB radio access node 102 is responsible for radio transmission and reception with UE devices 104 in one or more cells. Each eNB radio access node 102 controls the radio resources of its own cells and provides functions for configuring and making measurements on the radio environment.

Figure 2:
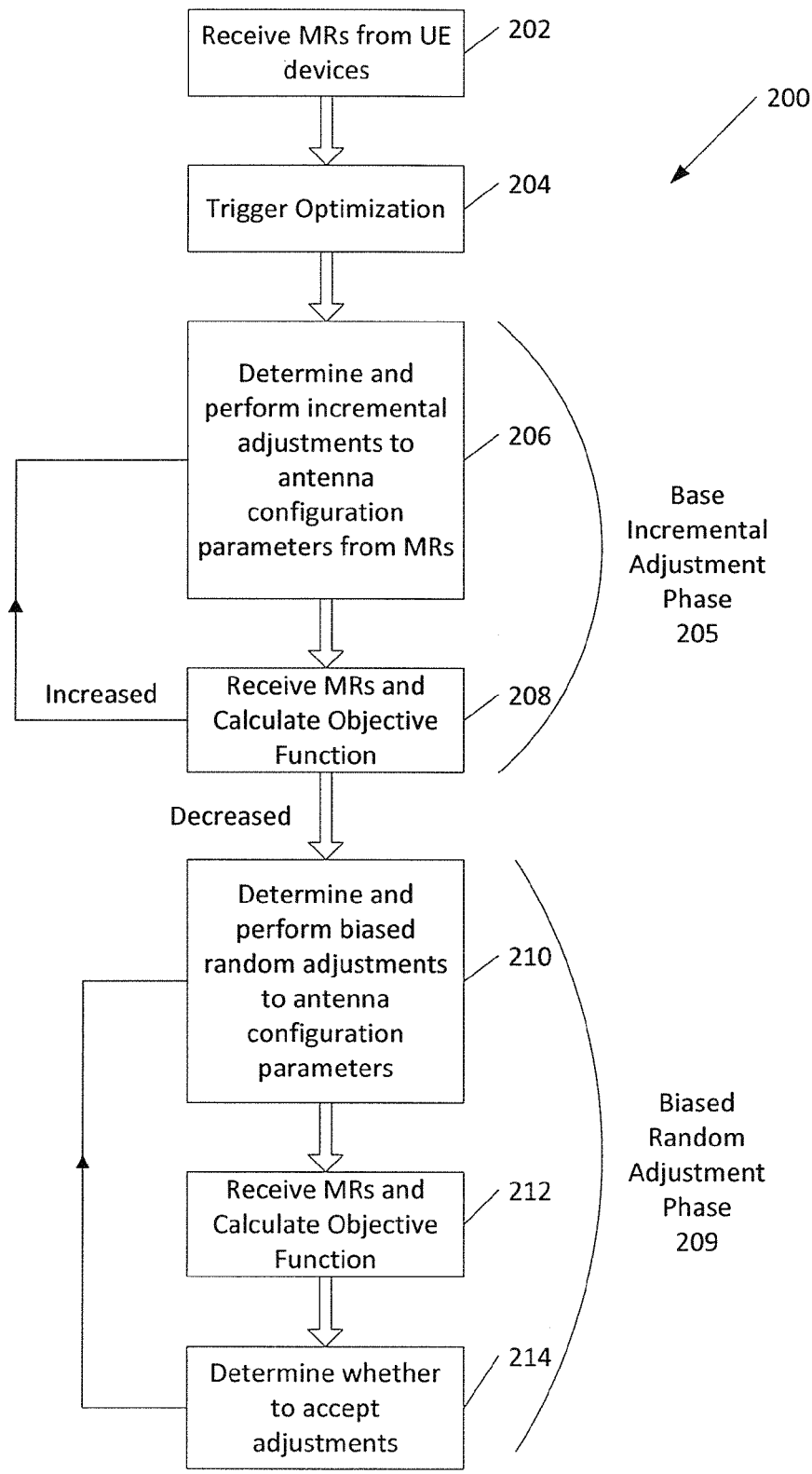
FIG. 2 illustrates an example process for optimizing cell specific antenna configuration parameters.

FIG. 2 shows a process 200 for optimizing performance in LTE network 100. In general, process 200 adjusts antenna configuration parameters incrementally online, jointly, and per cluster. Process 200 observes the resultant feedback from measurement reports (MRs) transmitted by UE devices 104 and continues in a closed loop to optimize over the long run. Antenna configuration parameters include electronic tilt, azimuth, and reference symbol power. Feedback from actual UE devices 104 is used in the form of MRs, as opposed to propagation model estimates. As known in the art, the MRs can include multiple UE-related and cell-related parameters, such as cell ID, reference signal received power (RSRP), reference signal received quality (RSRQ), serving cell ID, and timing advance parameters. The information in the MRs is used to update an objective function representing network performance, identify cell state indicator metrics/labels, and make step-wise antenna configuration parameter adjustments for performance progress. As known in the art, an objective function can be used for optimization of a measurable quantity, parameter, or feature, such as network performance. As used herein, the disclosed objective function can be used for optimization of network performance.

Process 200 does not need to know where UE devices 104 are located within LTE network 100 nor the exact antenna configuration parameter values in order to optimize performance. This contrasts with propagation model aided solutions (such as ACP) that require accurate user location and correct antenna configuration parameter values for each cell. Because correct configuration parameter values are not known, even if initial configuration parameters are erroneous, the antenna configuration parameter values can still be adjusted in a meaningful direction due to the fact that parameter changes lead to measurable change in cell/system metrics. As long as MRs (RSRP, RSSINR or RSRQ) from representative UE devices 104 (e.g., UE devices 104 selected by unbiased random sampling) are available for a given antenna configuration parameter change, the objective function can be evaluated accurately.

In the disclosed embodiments, every MR that is adjudged to have "failed" a coverage criterion (e.g., by virtue of a reported reference channel signal strength not meeting a pre-defined threshold) or a quality criterion (e.g., by virtue of a reported reference channel quality, i.e., signal to interference plus noise, not meeting another pre-defined threshold) assigns a notional unit of "blame" for such failure to a "responsible" cell or cells. If multiple cells are held responsible, fractional units of "blame" (or "shares of blame") are assigned to each responsible cell. When aggregated over all "failed" MRs, blame metrics can be calculated for each cell, and a base incremental action (e.g., antenna tilt or transmit power adjustment) can be taken by the cell in accordance with such blame metrics in order to reduce the rate of occurrence of MR failures.

Process 200 employs two closed loop phases—a base incremental adjustment phase 205 and a biased random adjustment phase 209. In the base incremental adjustment phase 205, cell level features or blame metrics are calculated from the MRs and, alternatively or in addition, cells are labeled according to a coverage, quality, interference, or overshooter status (described in greater detail below with respect to FIGS. 4A-4E) that map to "intuitively correct" adjustment directions for the antenna configuration parameters based on domain knowledge applied simultaneously on multiple cells in order to quickly grab big initial gains. MRs are processed to derive cell level metrics accounting for every cell's share of blame for measurement reports indicating inadequate coverage or quality. The cell level metrics determine what base incremental adjustments are made to that cell's antenna configuration parameters. Alternatively or in addition, MRs are processed to derive intuitive cell labels or combinations of cell labels indicating any of coverage, quality, interference, and overshooter status of each cell. The one or more labels attached to a cell determine the base incremental adjustments made to that cell's antenna configuration parameters.

The biased random adjustment phase 209 represents a mathematical search procedure that performs explorative techniques and chooses oppositional or random initial directions. Adjustments are accepted when the objective function is improved and accepted with decreasing probability as the objective function worsens and with passage of time (cooling) to steadily improve the solution. Over time, exploration direction can be conditioned to learn from mistakes and, in a later explorative pass, the action learned to be best (in the sense of maximizing instantaneous or cumulative rewards) for a given cell state is chosen. The key facts being exploited are that the system objective function and cell level metrics are aggregations of UE state information (MR) that don't require individual UE locations for evaluation, and that parameter changes matter but not the absolute value.

Process 200 begins at block 202 with the receipt of MRs from UE devices 104. Initiation of the optimization process is triggered at block 204. Optimization may be triggered manually, by network conditions, or automatically based on key performance indicators (KPIs) within LTE network 100. Examples of KPIs include call drop rate and call block rate. Other KPIs are known to those of skill in the art. If analysis of KPIs identify a degradation in network performance, then optimization is triggered. Upon triggering of optimization, process 200 proceeds to the base incremental adjustment phase 205, which includes blocks 206 and 208.

In the base incremental adjustment phase 205, MRs are used in block 206 to determine a direction of adjustment to the antenna configuration parameters (i.e., whether to adjust an antenna configuration parameter up or down). Only the direction of change is determined and not the specific current or starting values of the antenna configuration parameters. The direction of adjustment may be determined in several ways. In one example, the direction of change for each antenna configuration parameter is determined by a blame action metric where a majority rule of UE devices 104 provide MRs indicating a certain change in a direction (up or down) for a respective parameter. In another example, each cell is labeled with a cell status based on the MRs received from UE devices 104. A cell may be given one or more labels identifying a status of the cell, such as an interferer, non-interferer, good/weak coverage, good/weak quality, overshooter, and non-overshooter. Here, interference refers to downlink interference in the cell. These labels are typically determined based on a comparison with one or more thresholds. The exact determination of these thresholds is beyond the scope of this disclosure. The labels given to a particular cell determine the change in direction for the antenna configuration parameters associated with that particular cell.

Figures 3A, 3B, 3C, 3D, 3E:
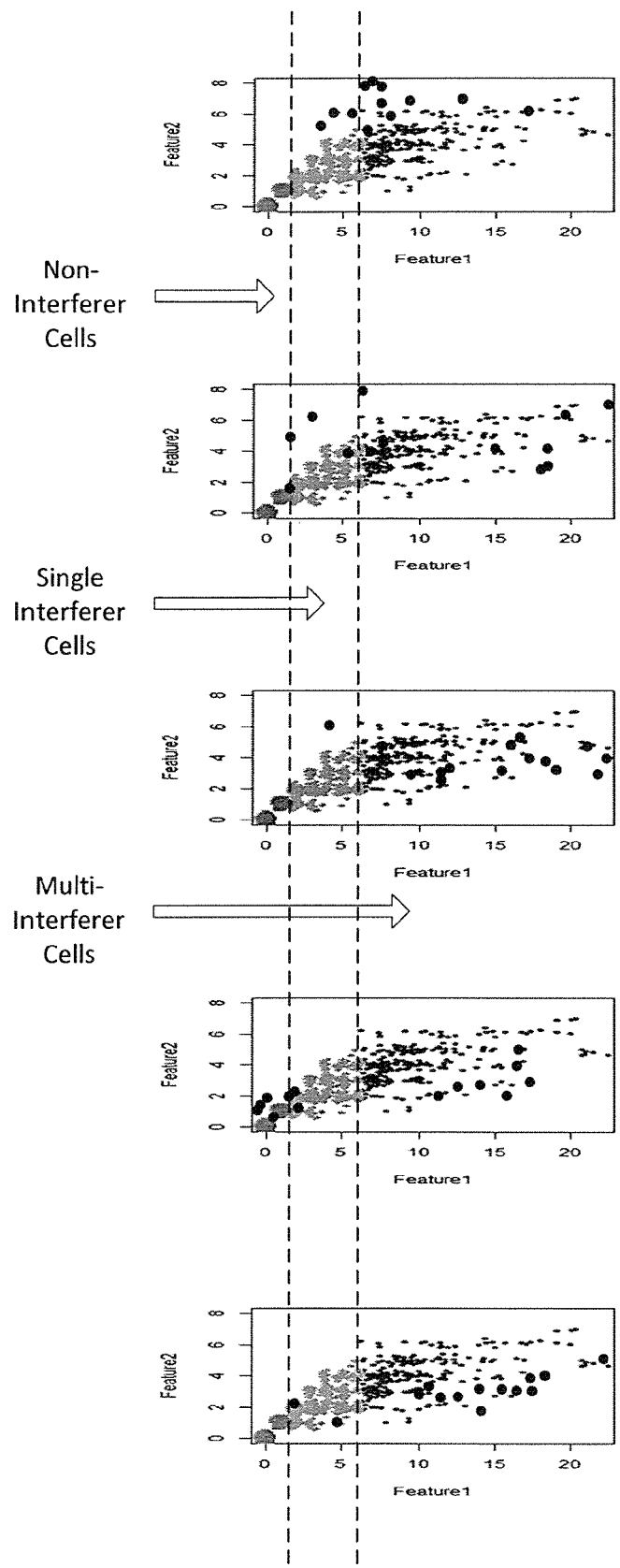
FIGS. 3A-3E illustrate example graphs of global historical data categorizing interfering cells for a plurality of LTE networks.
Figure 4A:
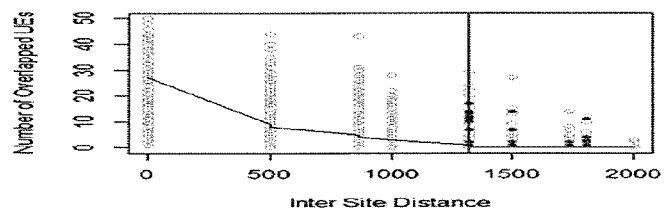
FIGS. 4A-4E illustrate example graphs categorizing cells as overshooter cells.
Figure 4B:
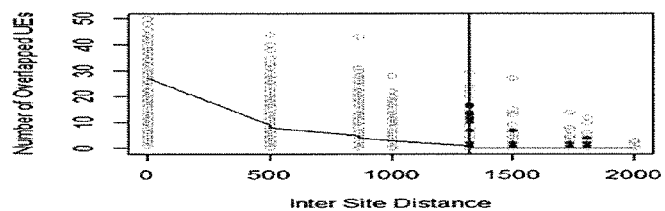
Figure 4C:
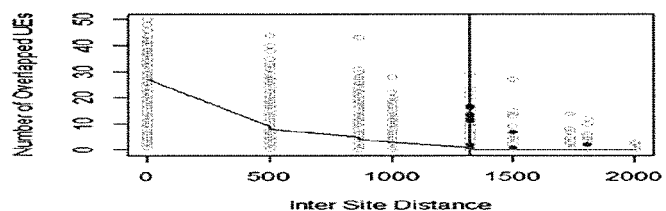
Figure 4D:
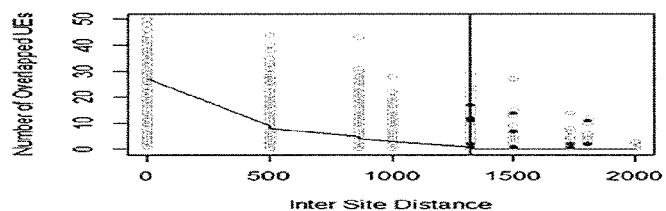
Figure 4E:
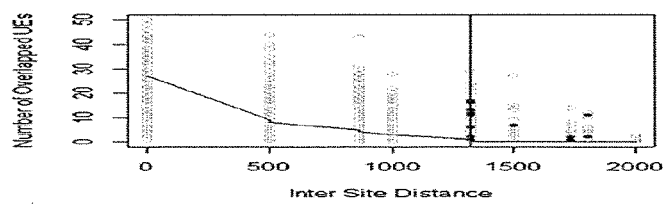

FIGS. 3A-3E show example graphs of global historical data categorizing interfering cells for a plurality of LTE networks. A cell is given an interferer label based on membership in a group cluster. The global historical data categorizes cells as non-interferer, single interferer, or multi-interferer, based on how many nearby cells experience interference from the given cell. The category a cell falls into determines its interferer label. The type of interferer label given to a particular cell determines the direction of adjustments made to the cell's antenna configuration parameters. After an adjustment is made to the antenna configuration parameters, a cell may fall into a different interferer category based on returned MRs from UE devices 104. FIGS. 3A-3E show how cells may move across interferer categories during various iterations of the base incremental adjustment phase 205. For example, looking at the larger circular dots in FIGS. 3A-3E, it can be seen that many of the larger dots improve toward non-interferer status through iteration 9 (FIG. 3D), but then cause greater interference and move to multi-interferer status in iteration 10 (FIG. 3E).

FIGS. 4A-4E show example graphs categorizing cells as overshooter cells. An example of an overshooter cell is a cell that provides a high reference signal received power (RSRP) to a UE device 104 but located some distance from the UE device 104. That is, an overshooter cell causes significant interference from a comparatively far distance (e.g., further than an adjacent cell). A cell labeled as an overshooter may have a particular direction of adjustments made to its antenna configuration parameters (e.g., a down power or down tilt). After an adjustment is made to the antenna configuration parameters, a cell may fall out of or into an overshooter status based on new MRs from UE devices 104, where the new MRs are determined after the adjustment to the antenna configuration parameters. FIGS. 4A-4E show how cells may move into and out of overshooter status during various iterations of the base incremental adjustment phase 205.

After each change in the antenna configuration parameters of the cells, the objective function for network optimization is calculated upon receiving new MRs in block 208 to determine if network performance improves. The objective function is based on a coverage parameter such as RSRP and a quality parameter such as signal to interference and noise ratio of the reference signal (RS-SINR). The objective function is determined by identifying those MRs having their RSRP parameter greater than a first threshold value and identifying those MRs having their RS-SINR parameter greater than a second threshold value. In some embodiments, the objective function is calculated according to the equation:

$$k1 * \text{number of (RSRP>threshold1)} + k2 * \text{number of (RS-SINR>threshold2)},$$

where $k1$ and $k2$ are non-negative numbers that sum to 1.0 and are determined in advance, e.g., by a system user (such as a network engineer) or automatically in a configuration routine. As long as network performance improves as indicated by an increase in the objective function, process 200 will loop through the base incremental adjustment phase 205 in blocks 206 and 208.

Upon identifying a decrease in the objective function in block 208, the base incremental adjustment phase 205 ends and the biased random adjustment phase 209 including blocks 210, 212, and 214 begins. In the biased random adjustment phase 209, simulated annealing is performed where random direction changes are made to the antenna configuration parameters and chaotic jumps are made to escape local minima positions in order to steadily improve the objective function toward a global optimum level. The biased random direction changes are accepted upon obtaining an improvement in the objective function. If the objective function decreases, a probability factor is used in determining whether to accept the random direction changes. Table I shows an example of a simulated annealing algorithm.

TABLE I

| | |
|---|---|
| 1. | Obtain initial solution S and position T |
| 2. | Determine C as the cost of S |
| 3. | Generate new solution S' |
| 4. | Determine C' as the cost of S' |
| 5. | Accept S' as the current solution S with probability p: <br> $p = \exp[(C-C')/T]$ if $C' \geq C$; $p=1$ if $C' < C$ |
| 6. | If equilibrium level has not been reached, go to 3. |
| 7. | Update position T |
| 8. | If termination criterion has not been reached, go to 3. |

Figure 5:
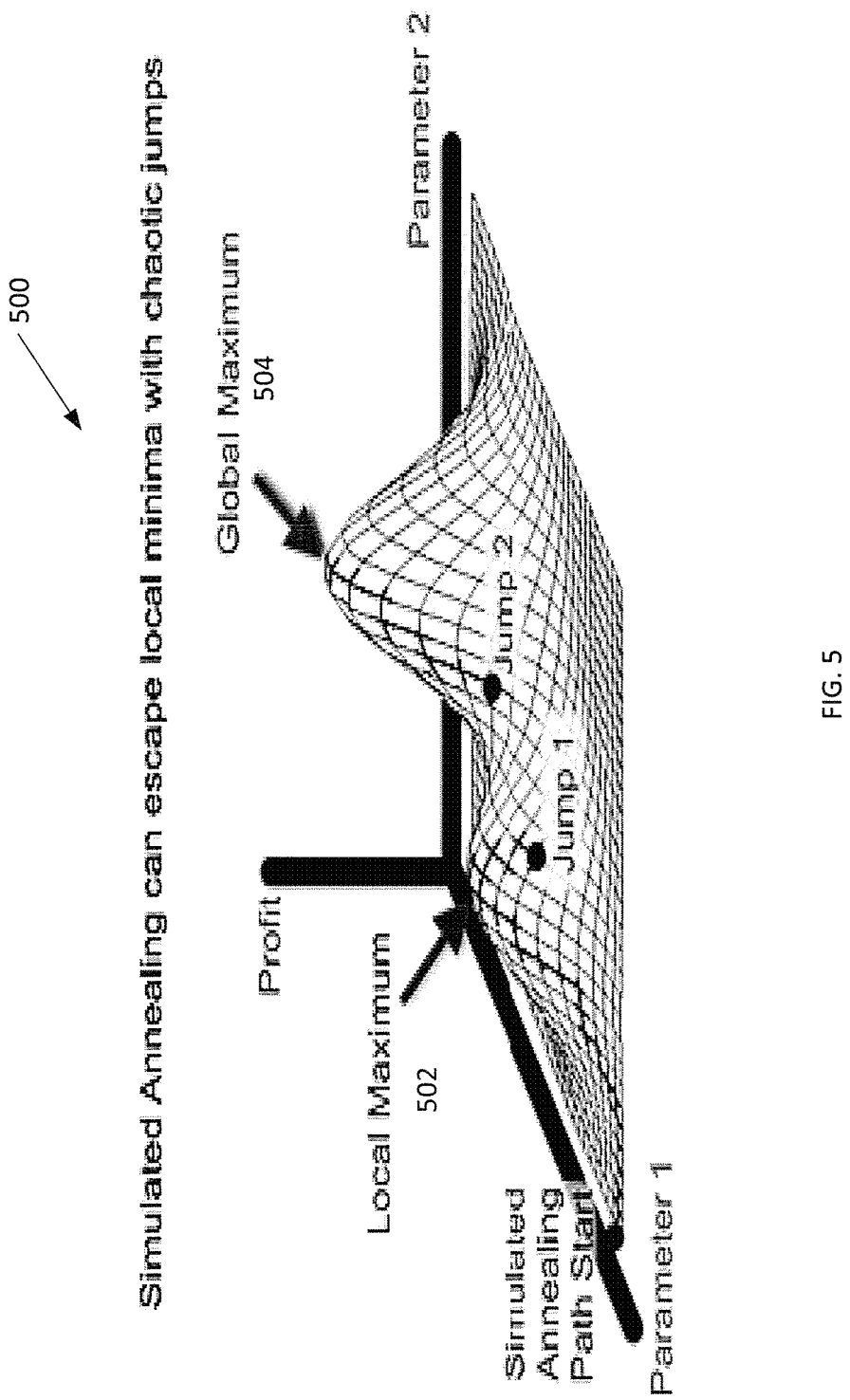
FIG. 5 illustrates a graph depicting an example simulated annealing process performed by the optimization process.

An example of the simulated annealing process that can be performed in the biased adjustment phase 209 is represented by the graph 500 in FIG. 5. The simulated annealing process may identify a local maximum 502 but may perform a chaotic jump (from Jump 1 to Jump 2) in order to locate a global maximum 504. Here, the maximums 502, 504 are determined maximums of the objective function described above. In terms of the present disclosure, biased random adjustments are determined and performed in block 210. After the biased random adjustments have been made, new MRs are received and used to calculate the objective function in block 212. A determination is made as to whether to accept or discard the adjustments based at least on the recalculated objective function in block 214. If the biased random adjustments are discarded, alternative biased random adjustments may be determined when the process 200 returns to block 210. The biased random adjustment phase 209 continues to loop through blocks 210, 212, and 214 and fine tune the parameters until a convergence to a global maximum is reached.

Figure 6:
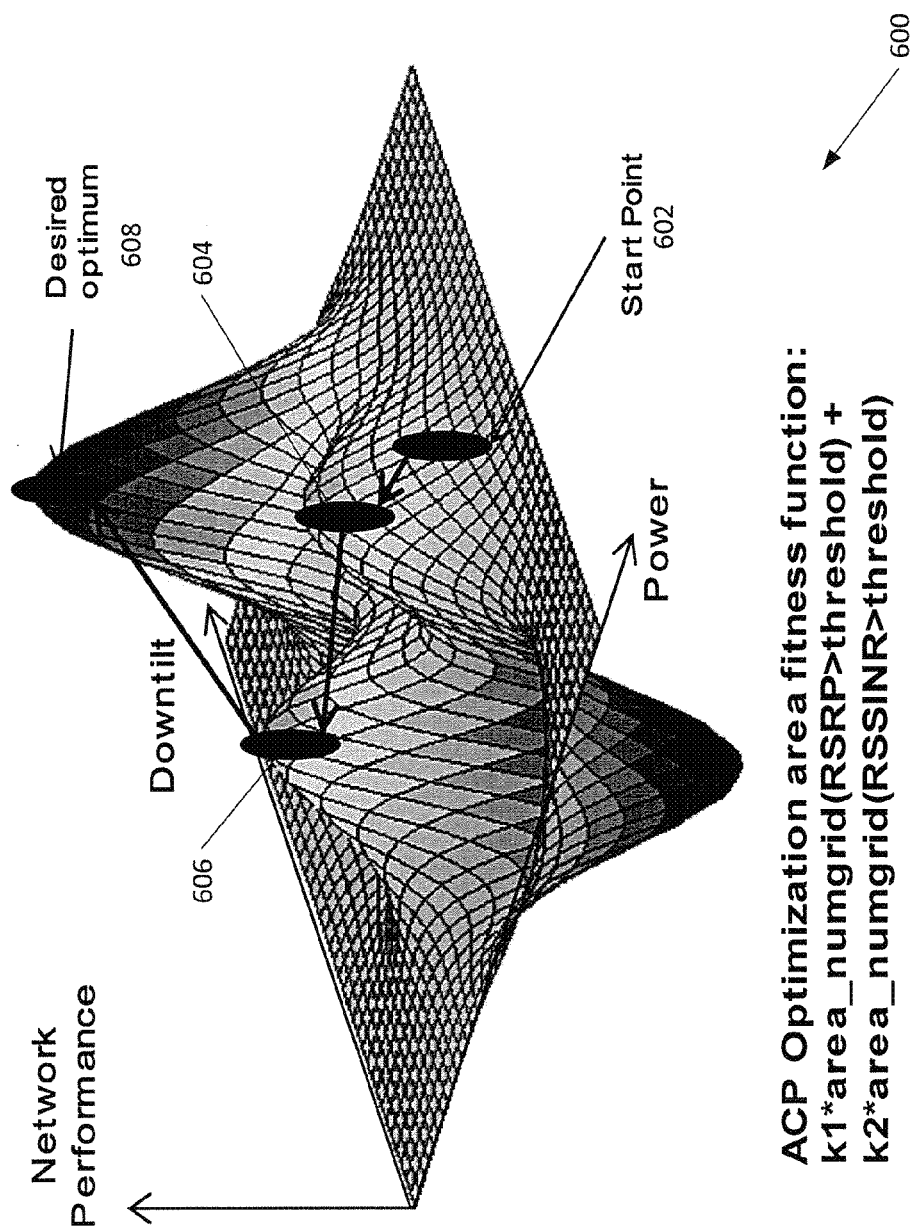
FIG. 6 illustrates a graph depicting network performance as a function of power and downtilt parameters.
Figure 7A:
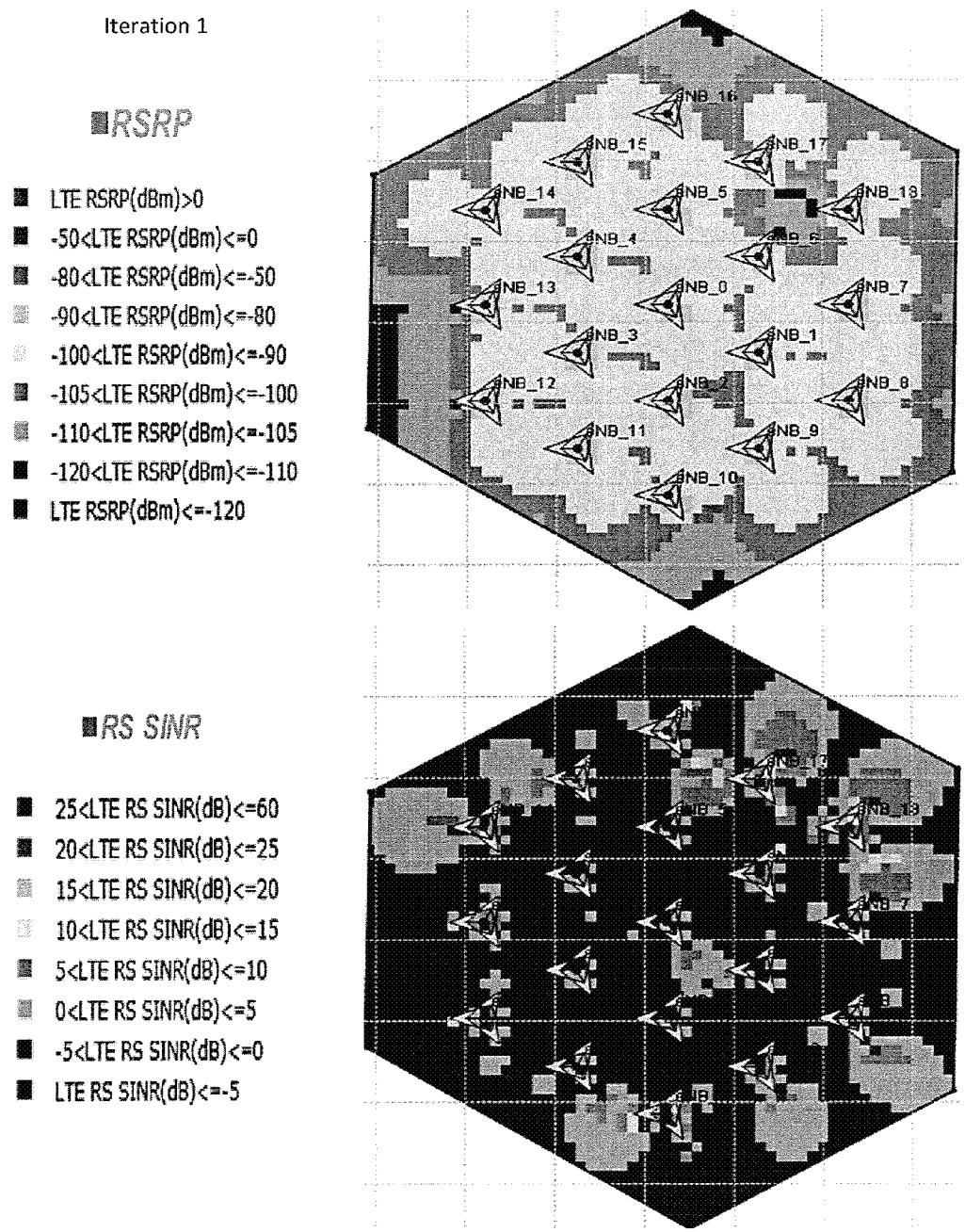
FIGS. 7A-7E illustrate changes in coverage and quality parameters in the LTE network through various iterations in a base incremental adjustment phase of the optimization process.
Figure 7B:
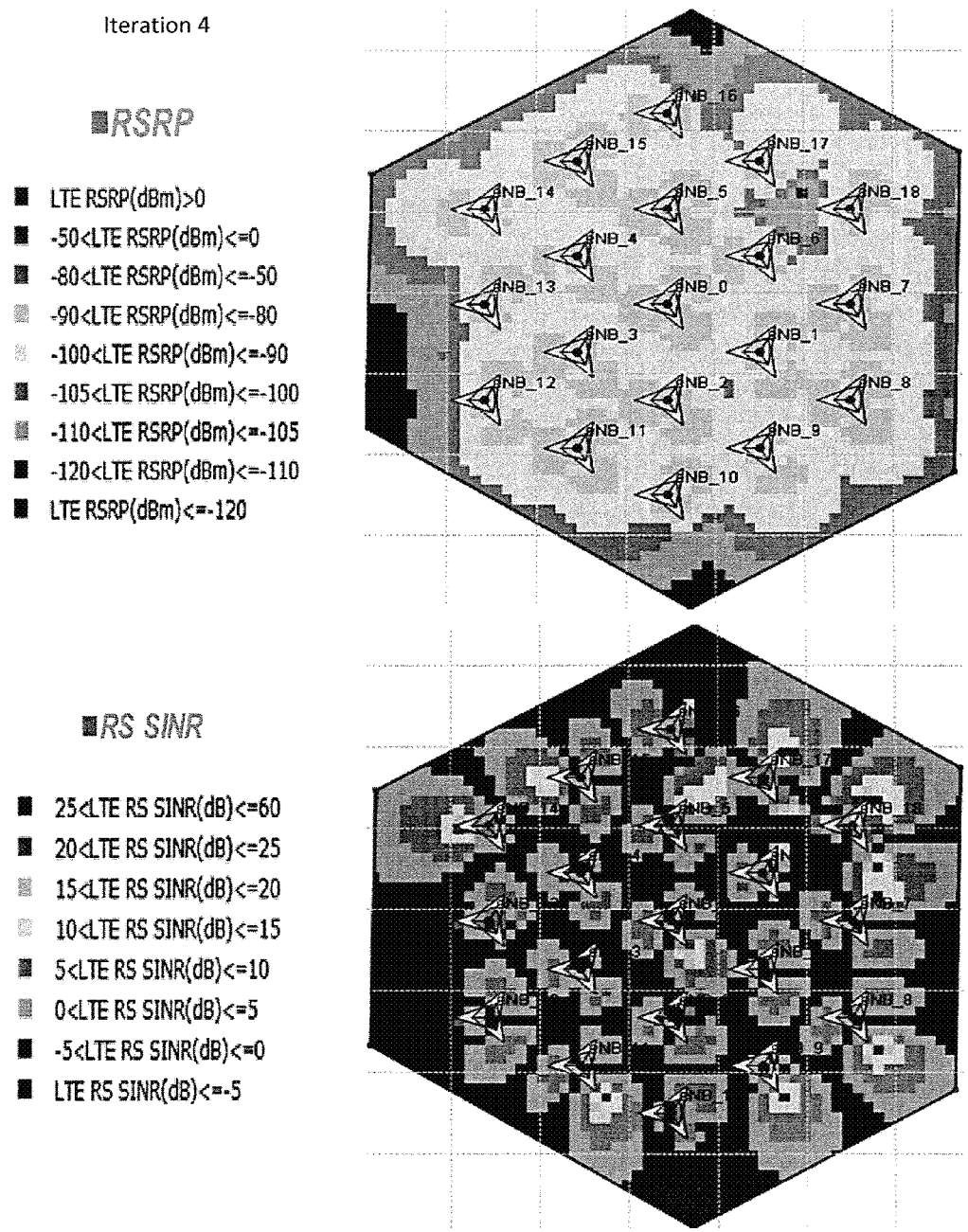
Figure 7C:
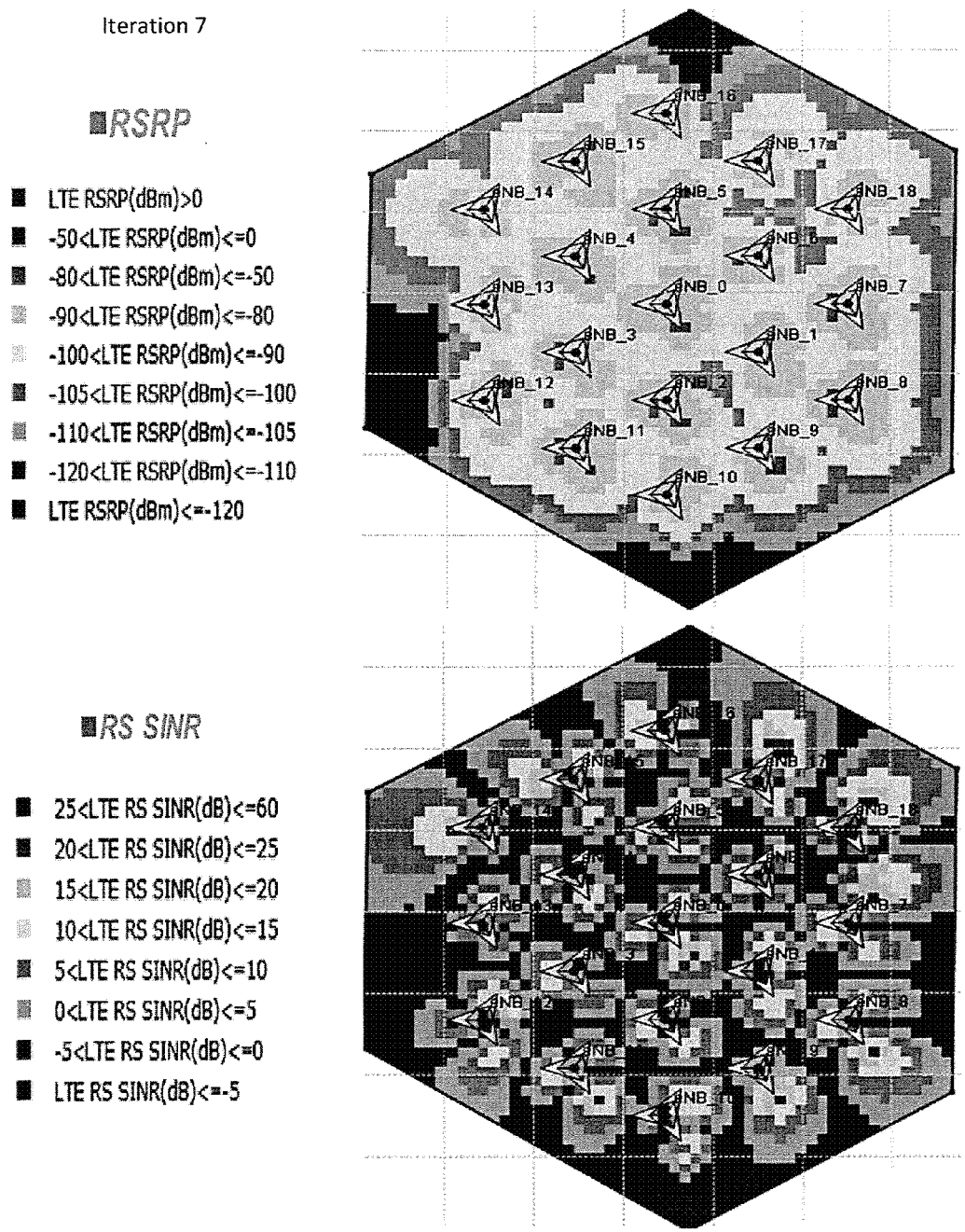
Figure 7D:
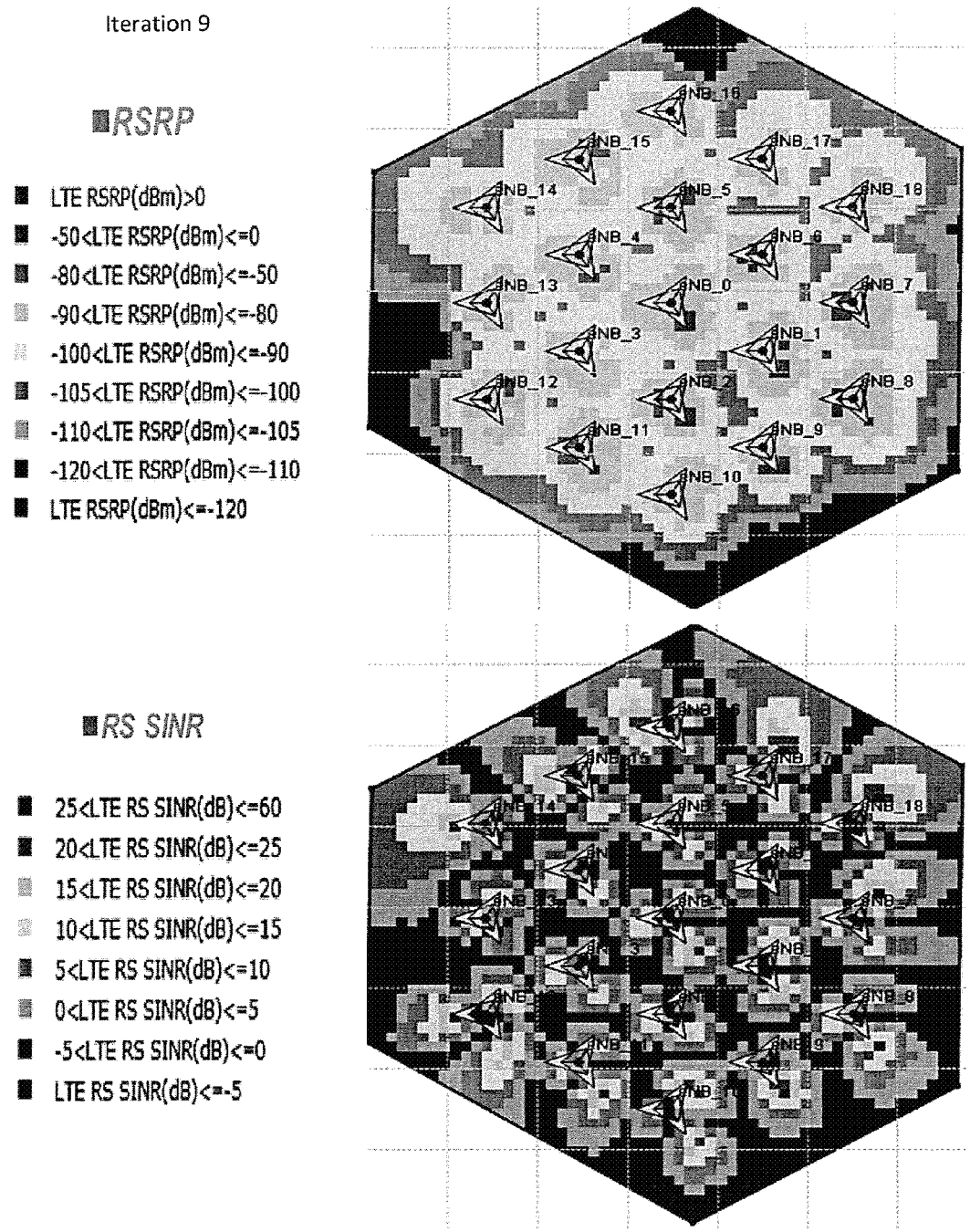
Figure 7E:
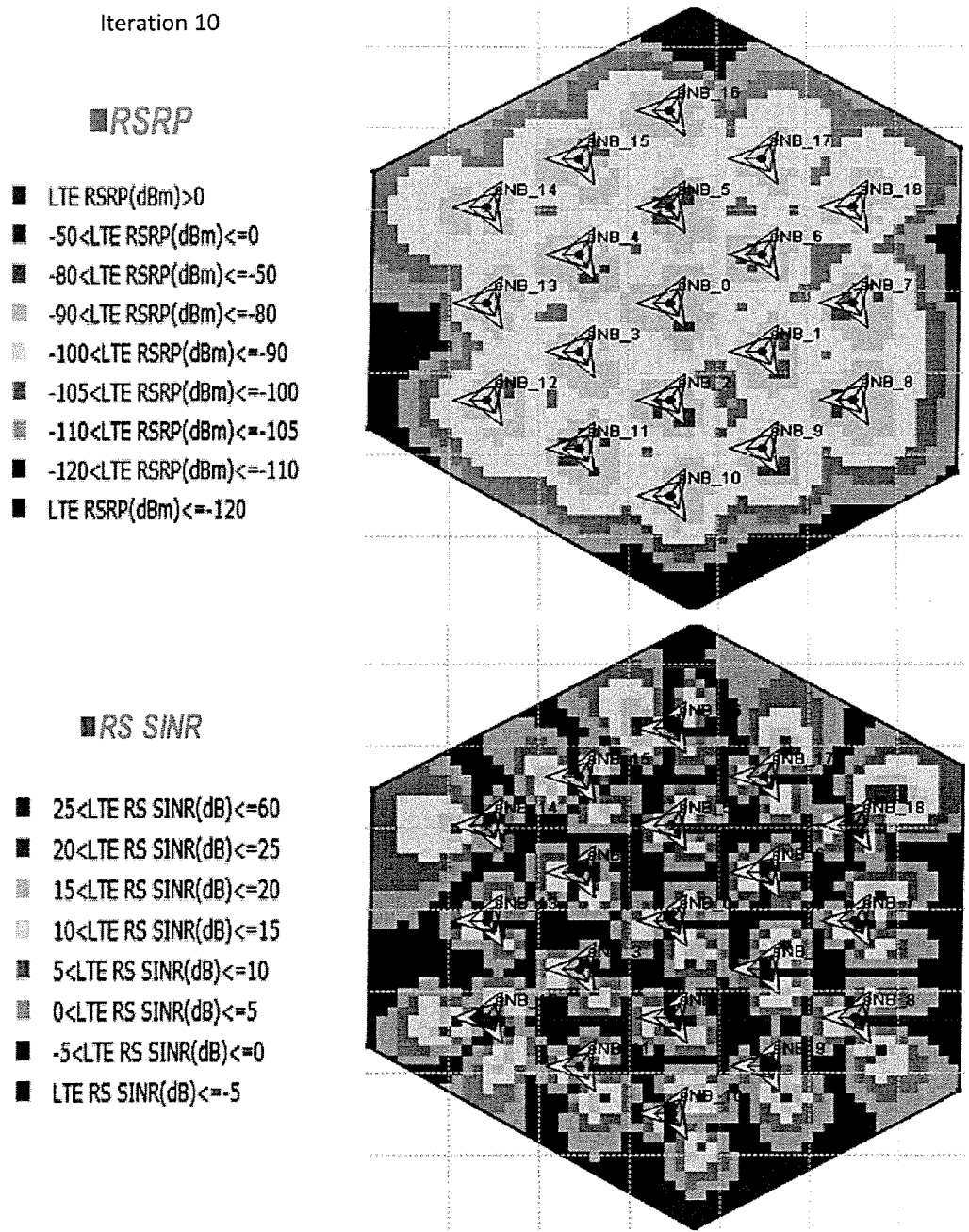

FIG. 6 shows a graph 600 of how the antenna configuration parameters of power and downtilt affect network performance (as measured by the objective function). The goal of process 200 is to identify a desired optimum network performance level 608 from a starting point 602. Process 200 is not aware of the particular starting point 602. Iterating through the base incremental adjustment phase 205 will attain a first intermediate network performance level 604. The biased random adjustment phase 209 will then kick in to perform chaotic jumps to identify the desired optimum network performance level 608, possibly through one or more second intermediate network performance levels 606.

FIGS. 7A-7E show the changes to the two parameters provided in the measurement reports through several iterations of the base incremental adjustment phase 205. The first measured parameter is RSRP. RSRP is a measure of signal strength and identifies the signal level of the Reference Signal transmitted by an eNB radio access node 102 and received by a UE device 104. RSRP is used by UE devices 104 for cell selection and reselection process and is reported to the network to aid in a handover procedure. RSRP is defined as the linear average over the power contributions of the resource elements that carry cell-specific reference signals within the considered measurement frequency bandwidth. The second measured parameter is RS-SINR. RS-SINR is a measure of signal quality and quantifies the relationship between RF conditions and throughput. UE devices 104 typically use RS-SINR to calculate a Channel Quality Indicator (CQI) reported to the network. RS-SINR indicates the power of measured usable signals, the power of measured signals or channel interference signals from other cells in the current system, and background noise related to measurement bandwidths and receiver noise coefficients. Though the present disclosure focuses on RSRP and RS-SINR, there are other parameters provided in the measurement reports that are used in operation of LTE network 100.

As shown in FIGS. 7A-7E, as the eNB radio access nodes 102 iterate through the process and perform base incremental adjustments to the antenna configuration parameters, the measured parameters RSRP and RS-SINR improve through each successive iteration. At some point in the base incremental adjustment phase 205, a lack of growth in the objective function occurs and a degradation can start to occur in the performance characteristics. This lack of growth (and possible degradation) is referred to as an improvement limit. For example, between iteration 9 of FIG. 7D and iteration 10 of FIG. 7E, the RSRP and RS-SINR values begin to decrease in certain areas of LTE network 100.

Figure 8:
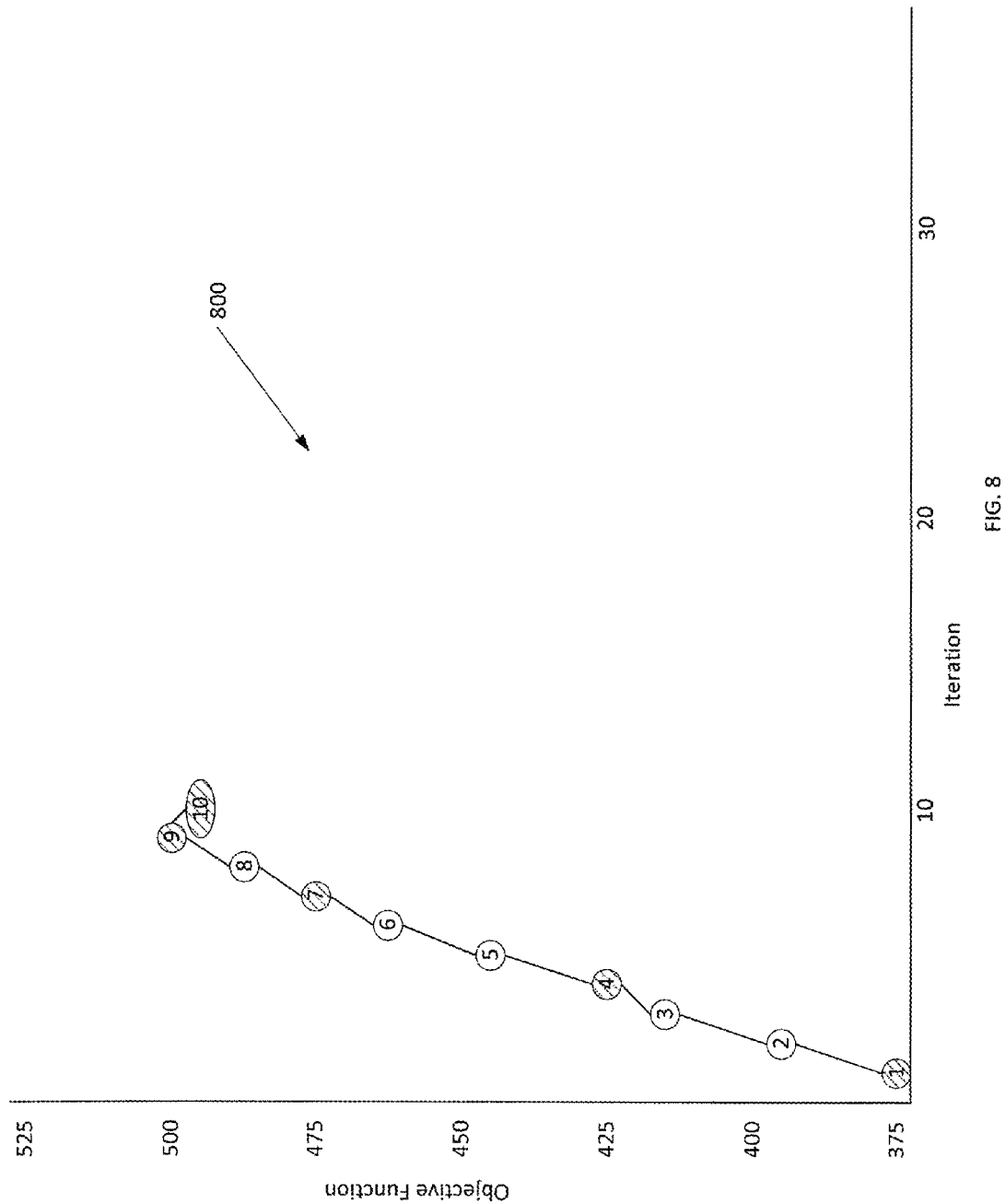
FIG. 8 illustrates a graph of an objective function through various iterations of the base incremental adjustment phase of the optimization process.

FIG. 8 shows a graph 800 depicting a change in the objective function through the iterations of the base incremental adjustment phase 205. Iteration numbers 1, 4, 7, 9, and 10 correspond to the results of the parameter adjustments shown in FIGS. 7A-7E. The base incremental adjustments rapidly improve performance within LTE network 100, as indicated by the rapid increase in objective function value. The trend in continued performance improvement continues up until a certain point. In complex, non-linear, and noise infused data environments such as provided by LTE network 100, base incremental adjustments to the antenna configuration parameters will reach an improvement limit where the objective function value does not increase (or increases only slightly) and may also provide improvement regression (e.g., a decrease in objective function value). Upon identifying a decrease in performance exceeding a desired threshold level, the base incremental adjustment phase 205 ends and the biased random adjustment phase 209 begins. In the example of FIG. 8, a decrease in performance represented by the objective function occurs between iteration 9 and iteration 10. Approximately at iteration 9 is where the improvement limit occurs.

Figure 9:
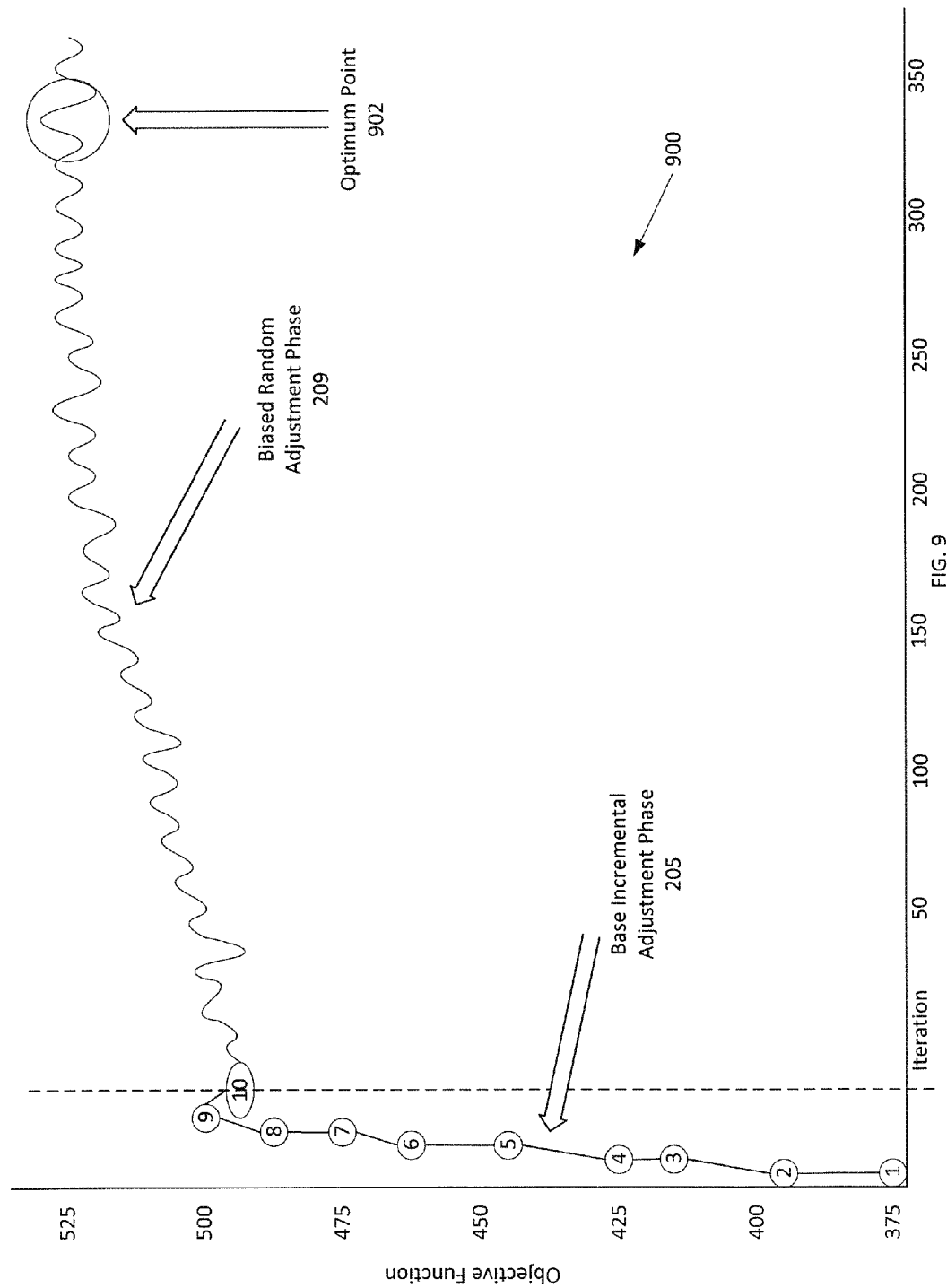
FIG. 9 illustrates a graph of the objective function through various iterations of a biased random adjustment phase of the optimization process.

FIG. 9 shows a graph 900 depicting a change in the objective function through the iterations of the biased random adjustment phase 209. As adjustments are accepted and discarded during the biased random adjustment phase 209, an upward drift in improvement in the objective function occurs subject to small oscillations along the way. The biased random adjustment phase 209 continues until an optimum point 902 is reached representing a global maximum, such as global maximum 304 of FIG. 3 or the desired optimum network performance level 408 of FIG. 4.

Figure 10:
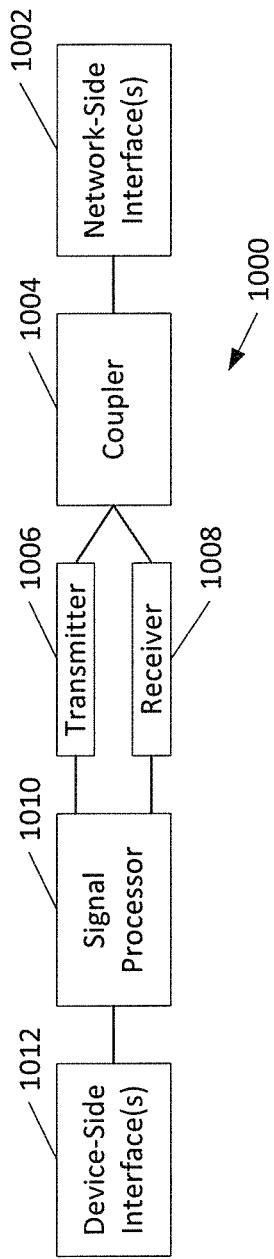
FIG. 10 illustrates a block diagram of an example processing system which may be implemented in the LTE network.

FIG. 10 illustrates a block diagram of a transceiver 1000 adapted to transmit and receive signaling over telecommunications network 100. One or more transceivers 1000 may be implemented in eNB radio access nodes 102 configured for optimizing cell specific antenna configuration parameters may be implemented, as described in the embodiments herein. As shown, the transceiver 1000 comprises a network-side interface 1002, a coupler 1004, a transmitter 1006, a receiver 1008, a signal processor 1010, and a device-side interface 1012. The network-side interface 1002 may include any component, circuitry, or combination thereof adapted to transmit or receive signaling over a wireless or wireline telecommunications network 100. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., UE devices 104, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. For example, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 11:
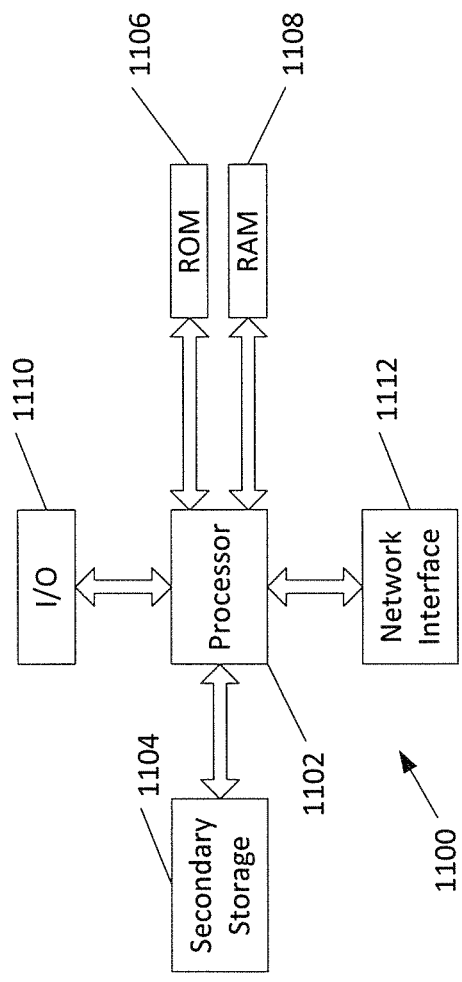
FIG. 11 illustrates a simplified example of a general-purpose computing component suitable for implementing one or more embodiments disclosed herein.

FIG. 11 illustrates a simplified example of a general-purpose computing component 1100 suitable for implementing one or more embodiments disclosed herein. Some of the features and embodiments described above for optimizing cell specific antenna configuration parameters may be implemented on any general-purpose computing component, such as a computer or network component with sufficient processing power, memory resources, and network throughput capability to handle the necessary workload placed upon it. For example, computing component 1100 may be implemented in each eNB radio access node 102 or in a centralized server at the network level to perform the features described herein. The computing component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network/component connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

In summary, an analytics assisted fully automatic closed loop self-organizing network provides a general framework for solving large scale near real time network optimization problems (SON use cases) The optimization process disclosed herein learns online the environment via real-time feedback of UE MRs and cell KPIs using machine learning analytics to assign actionable metrics/labels to cells. The optimizing process self-adapts internal algorithm parameters (like metric thresholds) to changing circumstances (data) and learns the correct action rule for a given cell in a given state. Domain expertise and sophisticated processes (explorative and learning based optimization) are combined in phases for deciding joint corrective actions. This approach contrasts to other approaches that use ad hoc engineering knowledge based rules and unreliable models. The optimization process is robust to engineering parameter database errors and lack of knowledge of UE locations and has minimal modeling assumptions in contrast to expensive and unreliable UE location based optimization techniques.

The optimization process is self-driving in that it uses machine learned cell labels or blame metrics with engineering knowledge guided small step actions to extract quick initial gains in network performance. For further optimization, action is taken in a biased random manner that balances reward with exploration risk. The optimization process learns from mistakes or wrong decisions with time to eventually pick a best action for a given cell state. As a result, the overall process is fast and outperforms engineers fazed by multi-cellular complex interactions. The optimization process provides a cost effective solution by reducing the need for an army of optimization engineers and expensive drive testing and model calibration. The optimization process may be readily extended to optimize additional CCO parameters like channel power offsets and CCO & Load Balancing (CCO+LB) scenarios. The optimization process works for diverse scenarios, including adapting to changes in the cellular network and traffic, and is readily transferable and scalable to other communication domains and deployments.

In some embodiments, some or all of the functions or processes of the one or more of the devices are implemented or supported by a computer program that is formed from computer readable program code and that is embodied in a computer readable medium. The phrase "code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. Upon execution, the computer program may detect core traces, convert the core traces into a hierarchical format, generate the gene function database, and determine preemption costs associated with the gene functions.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to and readily discernable by those skilled in the art. Accordingly, the above description of example embodiments does not define or constrain this disclosure. Other changes, substitutions, and alterations are also possible without departing from the scope of this disclosure as defined by the following claims.

What is claimed is:

1. A method for adjusting cell specific antenna configuration parameters, the method comprising:
   receiving, at each of a plurality of radio access nodes in a network, measurement reports from a plurality of user equipment devices;

performing, at each radio access node, base incremental adjustments to configuration parameters of one or more antennas at the radio access node in response to the measurement reports, wherein the measurement reports are processed to derive one or more of the following parameters on which the adjustments are based:
   cell level metrics accounting for every cell's share of blame for measurement reports indicating inadequate coverage or quality; and
   cell label combinations indicating any of a coverage, quality, interference, or overshooter status of each cell;
receiving, at each radio access node, additional measurement reports from the plurality of user equipment devices after the incremental adjustments;
continuing to perform base incremental adjustments to the configuration parameters of the one or more antennas at the radio access nodes in response to the measurement reports after previous incremental adjustments until an improvement limit has occurred; and
performing adjustments to the configuration parameters of the one or more antennas at the radio access nodes in accordance with a mathematical search procedure maximizing an objective function of coverage and quality in response to the improvement limit until a desired objective function value is achieved or for a certain number of iterations or until no further improvement is tangible.

2. The method of claim 1, wherein the mathematical search procedure comprises a biased random adjustment process, and the adjustments performed after the improvement limit are biased random adjustments to the configuration parameters of the one or more antennas at the radio access nodes to identify a global maximum peak in network performance.

3. The method of claim 2, further comprising:
accepting the biased random adjustments in response to an increase in the objective function value.

4. The method of claim 3, further comprising:
discarding the biased random adjustments in response to a decrease in the objective function value and a probability factor below a threshold value.

5. The method of claim 4, further comprising:
identifying alternative biased random adjustments in response to the decrease in optimization; and
performing the alternative biased random adjustments to the configuration parameters of the one or more antennas at the radio access node.

6. The method of claim 1, wherein the configuration parameters include antenna electrical tilt and reference symbol power.

7. The method of claim 1, wherein the base incremental adjustments are made in a direction based on a majority of up and down indications provided in the measurement reports.

8. The method of claim 1, further comprising:
determining a status of a cell provided by the radio access node after each base incremental adjustment; and
performing additional base incremental adjustments to configuration parameters of the one or more antennas at the radio access node in response to a change in the status of the cell.

9. The method of claim 1, further comprising:
triggering optimization based on one or more cell key performance indicators (KPIs) falling below a threshold level.

10. The method of claim 1, wherein the base incremental adjustments and the mathematical search procedure are performed without knowledge of the actual antenna configuration parameters.

11. The method of claim 1, wherein the base incremental adjustments and the mathematical search procedure are performed without knowledge of the location of the user equipment devices transmitting the measurement reports.

12. A system for adjusting cell specific antenna configuration parameters, the method comprising:
   a memory storing programming instructions; and
   a processor, upon executing the programming instructions, configured to:
      receive, at each of a plurality of radio access nodes in a network, measurement reports from a plurality of user equipment devices;
      perform, at each radio access node, base incremental adjustments to configuration parameters of one or more antennas at the radio access node in response to the measurement reports, wherein the measurement reports are processed to derive one or more of the following parameters on which the adjustments are based:
         cell level metrics accounting for every cell's share of blame for measurement reports indicating inadequate coverage or quality; and
         cell label combinations indicating any of a coverage, quality, interference, or overshooter status of each cell;
      receive, at each radio access node, additional measurement reports from the plurality of user equipment devices after the incremental adjustments;
      continue to perform base incremental adjustments to the configuration parameters of the one or more antennas at the radio access nodes in response to the measurement reports after previous incremental adjustments until an improvement limit has occurred; and
      perform adjustments to the configuration parameters of the one or more antennas at the radio access nodes in accordance with a mathematical search procedure maximizing an objective function of coverage and quality in response to the improvement limit until a desired objective function value is achieved or for a certain number of iterations or until no further improvement is tangible.

13. The system of claim 12, wherein the mathematical search procedure comprises a biased random adjustment process, and the adjustments performed after the improvement limit are biased random adjustments to the configuration parameters of the one or more antennas at the radio access nodes to identify a global maximum peak in network performance.

14. The system of claim 13, wherein the processor is further configured to:
accept the biased random adjustments in response to an increase in the objective function value.

15. The system of claim 14, wherein the processor is further configured to:
discard the biased random adjustments in response to a decrease in the objective function value and a probability factor below a threshold value.

16. The system of claim 15, wherein the processor is further configured to:
identify alternative biased random adjustments in response to the decrease in optimization; and perform the alternative biased random adjustments to the configuration parameters of the one or more antennas at the radio access node.

17. The system of claim 12, wherein the configuration parameters include antenna electrical tilt and reference symbol power.

18. The system of claim 12, wherein the base incremental adjustments are made in a direction based on a majority of up and down indications in the measurement reports.

19. The system of claim 12, wherein the processor is further configured to:
   determine a status of a cell provided by the radio access node after each base incremental adjustment; and
   perform additional base incremental adjustments to configuration parameters of the one or more antennas at the radio access node in response to a change in the status of the cell.

20. The system of claim 12, wherein the processor is further configured to:
   trigger optimization based on one or more cell key performance indicators (KPIs) falling below a threshold level.

21. The system of claim 12, wherein the base incremental adjustments and the mathematical search procedure are performed without knowledge of the actual antenna configuration parameters.

22. The system of claim 12, wherein the base incremental adjustments and the mathematical search procedure are performed without knowledge of the location of the user equipment devices transmitting the measurement reports.

* * * * *